(12) United States Patent
Park et al.

(10) Patent No.: US 12,122,235 B2
(45) Date of Patent: Oct. 22, 2024

(54) AUTOMOTIVE TRANSMISSION AND OPERATION METHOD FOR THE SAME

(71) Applicant: SL Corporation, Daegu (KR)

(72) Inventors: Jeongho Park, Gyeongsan-si (KR); Woojin Lee, Gyeongsan-si (KR); Youngern Jung, Gyeongsan-si (KR); Byungki Ji, Gyeongsan-si (KR)

(73) Assignee: SL Corporation, Daegu (KR)

( * ) Notice: Subject to any disclaimer, the term of this patent is extended or adjusted under 35 U.S.C. 154(b) by 247 days.

(21) Appl. No.: 17/972,721

(22) Filed: Oct. 25, 2022

(65) Prior Publication Data

US 2023/0150363 A1 May 18, 2023

(30) Foreign Application Priority Data

Nov. 12, 2021 (KR) .......................... 10-2021-0155839

(51) Int. Cl.
| | |
|---|---|
| *B60K 35/10* | (2024.01) |
| *B60K 23/00* | (2006.01) |
| *B60K 35/00* | (2006.01) |
| *B60K 35/53* | (2024.01) |
| *B60Q 3/283* | (2017.01) |
| *F16H 59/10* | (2006.01) |

(Continued)

(52) U.S. Cl.
CPC .............. *B60K 35/10* (2024.01); *B60K 23/00* (2013.01); *B60K 35/00* (2013.01); *B60K 35/53* (2024.01); *B60Q 3/283* (2017.02); *F16H 59/105* (2013.01); *B60K 20/06* (2013.01); *B60K 2360/126* (2024.01); *B60K 2360/128* (2024.01); *B60K 2360/131* (2024.01); *B60K 2360/682* (2024.01); *B60K 2360/685* (2024.01); *F16H 59/0278* (2013.01)

(58) Field of Classification Search
CPC ........ B60K 35/10; B60K 35/00; B60K 35/53; B60K 23/00; B60K 20/06; B60K 2360/126; B60K 2360/128; B60K 2360/131; B60K 2360/682; B60K 2360/685; B60Q 3/283; F16H 59/08; F16H 59/10; F16H 59/0278; F16H 59/105; F16H 2059/026; F16H 2059/0265
See application file for complete search history.

(56) References Cited

U.S. PATENT DOCUMENTS 4,281,526 A * 8/1981 Lipschutz ............. B60R 25/066
  70/205
5,156,243 A * 10/1992 Aoki ...................... B60K 20/06
  200/61.54

(Continued)

*Primary Examiner* — Timothy Hannon

(74) *Attorney, Agent, or Firm* — United One Law Group LLC; Kongsik Kim; Jhongwoo Peck

(57) ABSTRACT

A transmission device for a vehicle includes a vehicle state detector for detecting a vehicle state, the vehicle state including a first state which indicates that an ignition of the vehicle is off, and a second state which indicates that the ignition of the vehicle is on, a transmission operation unit that includes a fixed unit provided in a column of a steering wheel for enabling a transmission operation and a movable unit configured to be switched between a first position and a second position with respect to the fixed unit, and a position adjusting unit for adjusting a position of the movable unit based on the detected vehicle state.

20 Claims, 11 Drawing Sheets

(51) Int. Cl.
*B60K 20/06* (2006.01)
*F16H 59/02* (2006.01)

(56) References Cited

U.S. PATENT DOCUMENTS

| | | | | |
|---|---|---|---|---|
| 5,161,422 A | * | 11/1992 | Suman | B60R 25/06 |
| | | | | 180/315 |
| 6,076,414 A | * | 6/2000 | Tabata | F16H 59/10 |
| | | | | 74/335 |
| 9,303,755 B2 | * | 4/2016 | Kim | F16H 59/10 |
| 2006/0037424 A1 | * | 2/2006 | Pickering | B60K 35/10 |
| | | | | 74/473.3 |
| 2007/0204718 A1 | * | 9/2007 | Strait | G05G 5/06 |
| | | | | 74/523 |
| 2007/0261509 A1 | * | 11/2007 | Meyer | G05G 9/02 |
| | | | | 74/504 |

* cited by examiner

AUTOMOTIVE TRANSMISSION AND OPERATION METHOD FOR THE SAME

CROSS-REFERENCE TO RELATED APPLICATION(S)

This application claims priority from Korean Patent Application No. 10-2021-0155839, filed on Nov. 12, 2021, which is incorporated herein by reference in its entirety.

BACKGROUND

1. Technical Field

The present disclosure relates to a transmission device for a vehicle and an operating method thereof, and more particularly, to a vehicle transmission device capable of easily recognizing a vehicle state via a transmission operation unit, and an operating method thereof.

2. Description of the Related Art

A transmission device may adjust a gear ratio to keep the engine at a particular rotation speed based on the speed of the vehicle, and the driver operates the transmission lever to change the gear ratio of the transmission.

As the transmission mode of the transmission device, there are a manual transmission mode, in which the driver can manually shift transmission stages, and an automatic transmission mode, in which a gear ratio is automatically shifted based on the vehicle speed when the driver selects the driving stage (D).

In addition, a sports mode capable of performing manual transmission and automatic transmission in one transmission device is also being used. Since a transmission device capable of manual transmission is provided in addition to a transmission device that performs automatic transmission, the sports mode primarily performs automatic transmission while allowing the driver to perform manual transmission of increasing or decreasing the gear stages.

In this case, the transmission lever simply serves to allow the driver to select a transmission stage, and a method for providing more diverse information via the transmission lever is required.

SUMMARY

The present disclosure has been devised to solve the above problems, and the technical object of the present disclosure is to provide a transmission device for a vehicle, in which a driver can more easily recognize the vehicle's state via a movable unit whose position is changed relative to a fixed unit, and also to provide an operation method of such a transmission device for a vehicle.

The objects of the present disclosure are not limited to the ones mentioned above, and other objects will be clearly understood by those skilled in the art from the following description.

According to an aspect of the present disclosure, a transmission device for a vehicle may include a vehicle state detector for detecting a vehicle state, the vehicle state including a first state which indicates that an ignition of the vehicle is off, and a second state which indicates that the ignition of the vehicle is on; a transmission operation unit that includes a fixed unit provided in a column of a steering wheel for enabling a transmission operation and a movable unit configured to be switched between a first position and a second position with respect to the fixed unit; and a position adjusting unit for adjusting a position of the movable unit based on the detected vehicle state.

The first state may include a state in which an engine of an internal combustion engine vehicle is not running or a state in which an electric vehicle is not drivable, and the second state may include a state in which the engine of the internal combustion engine vehicle is running or a state in which the electric vehicle is drivable.

The movable unit of the transmission operation unit may be disposed at the first position in response to the vehicle state being the first state to disable the transmission operation, and the movable unit of the transmission operation unit may be disposed at the second position in response to the vehicle state being the second state to enable the transmission operation. An initial transmission stage may be P or N stage in response to the movable unit being in the second position, and another transmission stage may become selectable in response to at least one transmission condition being satisfied.

The first state may include an ignition preparation state which indicates that the ignition of the vehicle is off and the vehicle is expected to be driven.

To select a transmission state while the movable unit is in the second position, at least a portion of the transmission operation unit may be rotated or tilted.

The transmission operation unit may further include at least one light emitting module installed in at least one of the fixed unit or the movable unit for forming a lighting image having a predetermined shape. The at least one light emitting module may form a lighting image that performs a welcoming function in the first state, and may form a lighting image that indicates a current transmission stage in the second state.

In some embodiments, the movable unit may be rotatably coupled to the fixed unit to be rotatable with respect to a tilting axis. In particular, a central axis of the movable unit and a central axis of the fixed unit may be angled with each other in the first position, and the central axis of the movable unit and the central axis of the fixed unit may be parallel with each other in the second position. In some such embodiments, the position adjusting unit may include a driving unit, and a rotation shaft that is rotated with respect to a rotation axis of the movable unit by a driving force from the driving unit to allow the movable unit to be tilted about the tilting axis at a predetermined angle with respect to a central axis of the fixed unit.

In some embodiments, the movable unit may be coupled to the fixed unit to be linearly movable substantially along a longitudinal direction of the fixed unit. In particular, when the movable unit moves linearly, the central axis of the fixed unit and the central axis of the movable unit may be parallel with each other in both the first position and the second position. In some such embodiments, the position adjusting unit may include a driving unit, and a translation shaft coupled to the movable unit. The translation shaft may be configured to be linearly moved by a driving force from the driving unit.

Further, a storage space may be further provided, such that the transmission operation unit may be accommodated. More particularly, the transmission operation unit may be moved between inside and outside of the storage space based on the detected vehicle state.

According to another aspect of the present disclosure, a method for operating a transmission device of a vehicle may include detecting a vehicle state, the vehicle state including a first state which indicates that an ignition of the vehicle is off, and a second state which indicates that the ignition of the vehicle is on; and adjusting a position of a movable unit between a first position and a second position based on the detected vehicle state. In particular, the movable unit may be coupled to a fixed unit provided in a column of a steering wheel, such that the position of the movable unit may be adjustable with respect to the fixed unit.

In some embodiments, the step of adjusting the position may include rotating the movable unit with respect to a tilting axis. In some embodiments, the step of adjusting the position may include linearly moving the movable unit substantially along a longitudinal direction of the fixed unit.

Further, the method may include forming a lighting image having a predetermined shape using a light emitting module installed in at least one of the fixed unit or the movable unit depending on whether the movable unit is disposed in the first position or the second position. In some such embodiments, the step of forming the lighting image may include forming a lighting image that performs a welcoming function in response to the movable unit being in the first position, and forming a lighting image that indicates a current transmission stage in response to the movable unit being in the second position.

According to the vehicle transmission device and operating method thereof of the present disclosure as described herein, there are one or more of the following effects. Since the position of the movable unit is adjusted based on the vehicle state, the driver can more easily recognize the vehicle state, thereby improving the driver's convenience and safety. Effects of the present disclosure are not limited to the ones mentioned above, and other effects will be clearly understood by those skilled in the art from the description of the claims.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
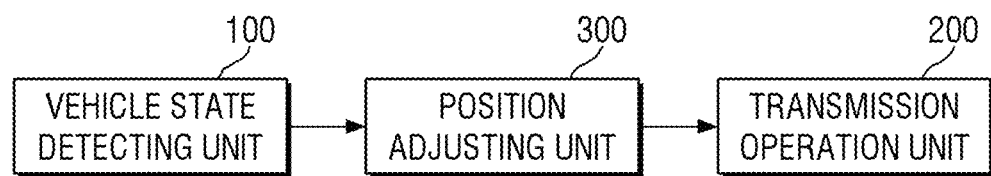
FIG. 1 is a block diagram showing the configuration of a transmission device for a vehicle according to an embodiment of the present disclosure.

Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims. Throughout the specification, like reference numerals in the drawings denote like elements.

In some embodiments, well-known steps, structures and techniques will not be described in detail to avoid obscuring the disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Embodiments of the disclosure are described herein with reference to plan and cross-section illustrations that are schematic illustrations of idealized embodiments of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing. In the drawings, respective components may be enlarged or reduced in size for convenience of explanation.

Hereinafter, the present disclosure will be described with reference to the drawings for describing a transmission device for a vehicle and an operating method thereof according to embodiments of the present disclosure.

Figure 2:
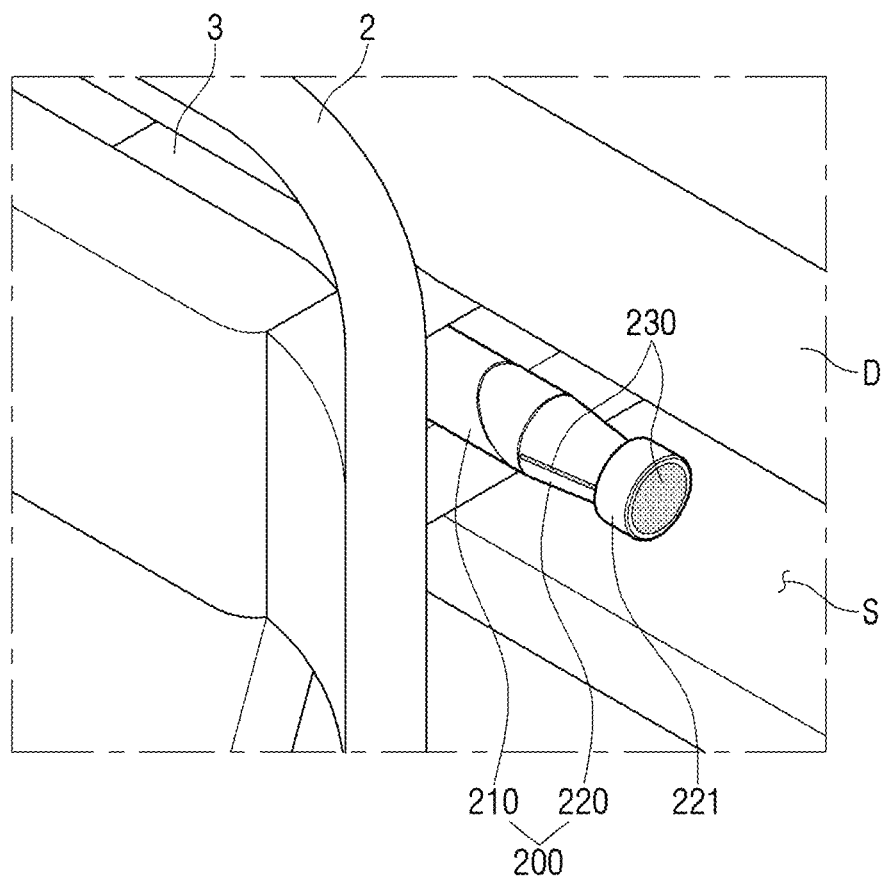
FIG. 2 is an overall view of a transmission device for a vehicle according to an embodiment of the present disclosure.

FIG. 1 is a block diagram illustrating the configuration of a transmission device for a vehicle according to an embodiment of the present disclosure, and FIG. 2 is a schematic diagram showing an overall view of the transmission device for a vehicle according to an embodiment of the present disclosure.

Referring to FIGS. 1 and 2, the vehicle transmission device 1 according to an embodiment of the present disclosure may include a vehicle state detector 100, a transmission operation unit 200, and a position adjusting unit 300.

In the embodiment of the present disclosure, an example in which the vehicle transmission device 1 is a column type that is installed in the column 3 of a steering wheel 2 so as to secure an internal space of the vehicle will be described, but the present disclosure is not limited thereto. It may be similarly applied to a floor type that is installed in the center console between the center fascia and the console box of a vehicle.

The vehicle state detector 100 may detect at least one vehicle state for activating the transmission operation unit 200 via various sensors installed in the vehicle, and activation of the transmission operation unit 200 may be understood as switching the transmission operation unit 200 to a state that enables the driver's transmission operation.

In the embodiment of the present disclosure, an example in which the vehicle state detector 100 detects at least a first state and a second state will be described. More particularly, the first state may indicate that the ignition of the vehicle is turned off, and may also include an ignition preparation state to be described later below. The second state may indicate that the ignition of the vehicle is turned on. The first state may be understood as a state when the engine is not operating for the case of internal combustion engine vehicles or a state when the vehicle is not drivable for the case of electric vehicles. The second state may be understood as a state when the engine is operating for the case of internal combustion engine vehicles or a state when the vehicle is drivable for the case of electric vehicles. In addition, the ignition preparation state may be understood as a state in which the driving of the vehicle is expected in the near future, such as when the door of the vehicle is opened, a driver with a smart key approaches the vehicle, a driver is detected within the vehicle, or the brake is applied, while the ignition of the vehicle is turned off.

The detection result of the vehicle state detector 100 may be delivered to a controller such as an electronic control unit (ECU), and the controller may be configured to generate a control signal for adjusting the position of a movable unit 220 to be described later below based on the detected vehicle state. The vehicle state to be detected by the vehicle state detector 100 is not limited to the above-described examples, and various vehicle states necessary for activating the transmission operation unit 200 may be included.

The transmission operation unit 200 may include a fixed unit 210 and a movable unit 220.

The fixed unit 210 may be disposed to protrude from the column 3 in a direction in which a driver's transmission operation is possible, and the movable unit 220 may be coupled to the fixed unit 210 so that its position may be changed between the first position and the second position. In an embodiment of the present disclosure, the position of the movable unit 220 may be switched between the first position and the second position so that the driver can more easily recognize the vehicle state as detected by the vehicle state detector 100.

For example, in an internal combustion engine vehicle, it can be recognized that the ignition of the vehicle is turned on due to the engine noise or vibration. However, unlike the internal combustion engine vehicles, since electric vehicles use the driving force of the motor as a power source, engine noise or vibrations may not occur, so it may be more difficult for the driver to recognize whether the ignition of the vehicle is turned on. Thus, in the embodiment of the present disclosure, the movable unit 220 may be presented in different positions depending on the vehicle state, so that not only in an internal combustion engine vehicle, but also in an electric vehicle, the driver can more easily recognize that the vehicle's ignition is turned on.

The position of the movable unit 220 may be adjusted to be disposed at the first position or the second position by a rotational movement, a linear movement, or a combination thereof, with respect to the fixed unit 210.

In this case, it will be described as an example that the first position collectively refers to a position of the movable unit 220 to disable the driver's transmission operation when the transmission operation is not required, for example, in the first state. The second position may collectively refer to a position of the movable unit 220 to enable the driver's transmission operation when the transmission operation is required, for example, in the second state.

Figure 3:
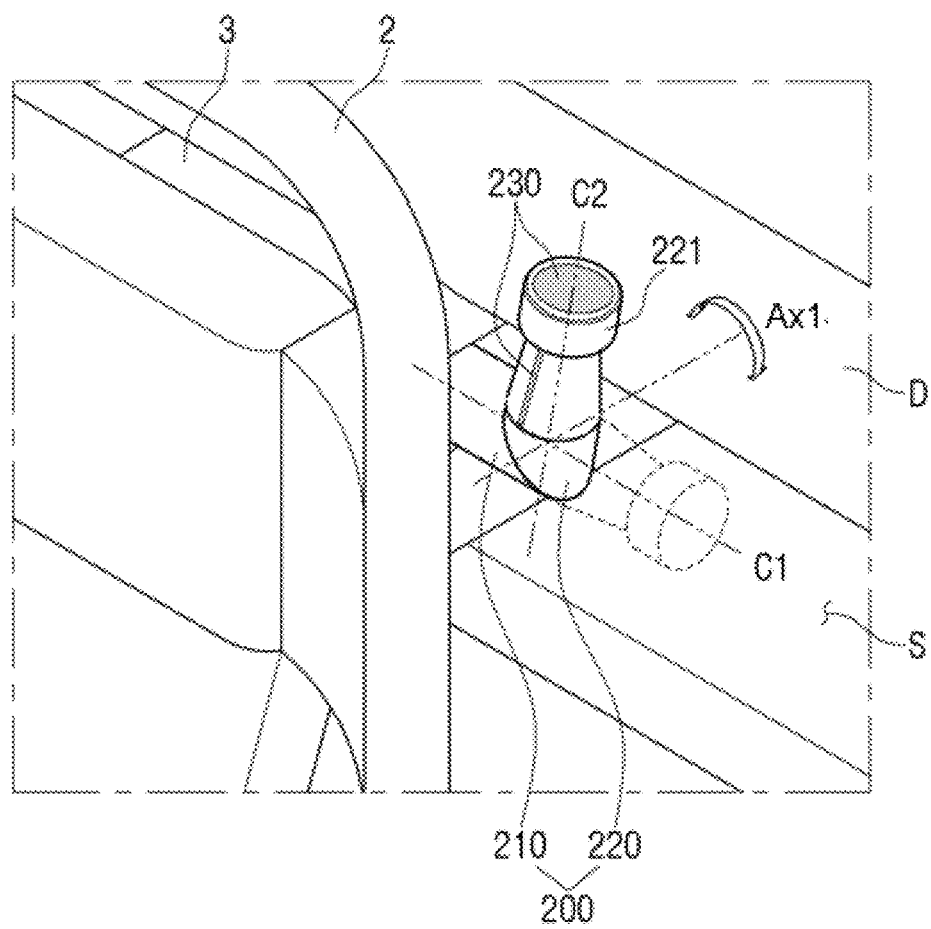
FIG. 3 is a schematic diagram showing a movable unit disposed at a first position or a second position by rotational movement according to an embodiment of the present disclosure.

FIG. 3 is a schematic diagram illustrating a movable unit disposed at the first position and the second position by a rotational movement according to an embodiment of the present disclosure. Referring to FIG. 3, according to the embodiment of the present disclosure, since the driver's transmission operation is not required when the vehicle is in the first state, the movable unit 220 may be disposed at the first position so that the central axis C1 of the fixed unit 210 intersect the central axis C2 of the movable unit 220 (in other words, the central axis C1 of the fixed unit 210 and the central axis C2 of the movable unit 220 are not aligned). In this case, since the transmission operation unit 200 has an overall bent shape due to the fixed unit 210 and the movable unit 220 being angled with each other, the space occupied by the transmission operation unit 200 may be reduced while preventing the driver's inadvertent operation.

On the other hand, in the second state, the movable unit 220 may be rotated with respect to a tilting axis Ax1 and may be disposed at the second position, so that the central axis C1 of the fixed unit 210 and the central axis C2 of the movable unit 220 are parallel with each other, as shown in FIG. 2. As such, the driver can more easily recognize that the ignition of the vehicle is turned on.

Herein, the central axis C1 of the fixed unit 210 and the central axis C2 of the movable unit 220 may be understood as axial lines that pass through the center of the fixed unit 210 and the center of the movable unit 220, respectively, in the longitudinal direction of the transmission operation unit 200 when the movable unit 220 is positioned at the second position.

In the above-described embodiment, the movable unit 220 may be rotated with respect to the tilting axis Ax1 and disposed at the first position or the second position, but the present disclosure is not limited thereto. The movable unit 220 may be linearly moved while the central axis C1 of the fixed unit 210 and the central axis C2 of the movable unit 220 are aligned or parallel with each other, so that the movable unit 220 is disposed at the first position or the second position.

Figure 4:
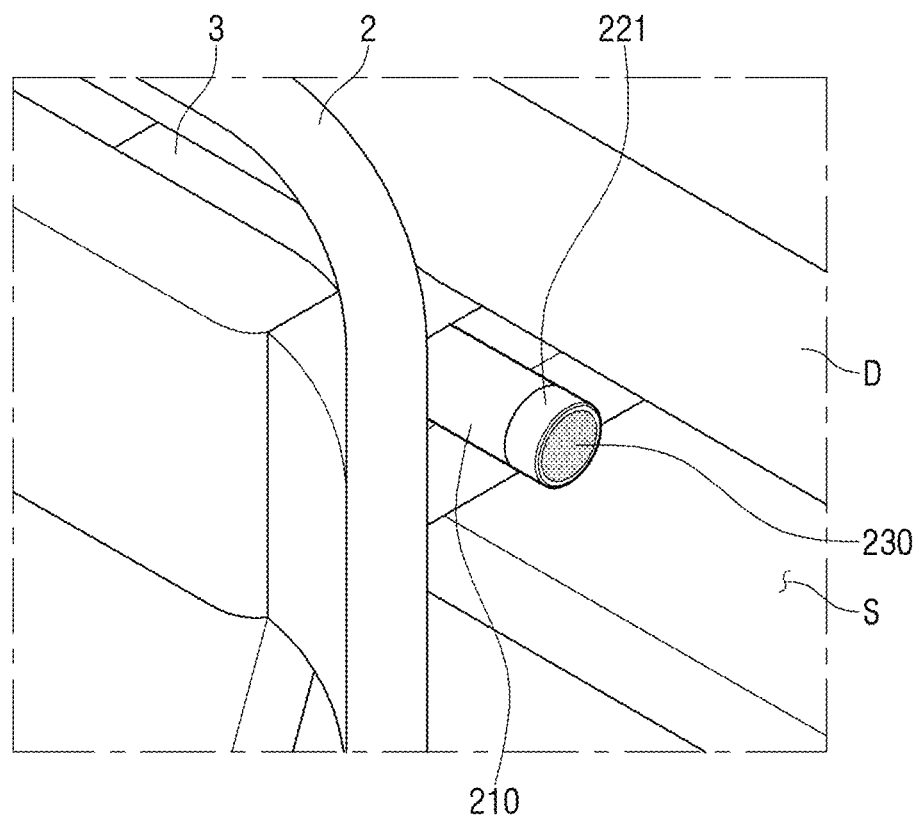
FIGS. 4 and 5 are schematic views showing a movable unit disposed at a first position or a second position by linear movement according to an embodiment of the present disclosure.
Figure 5:
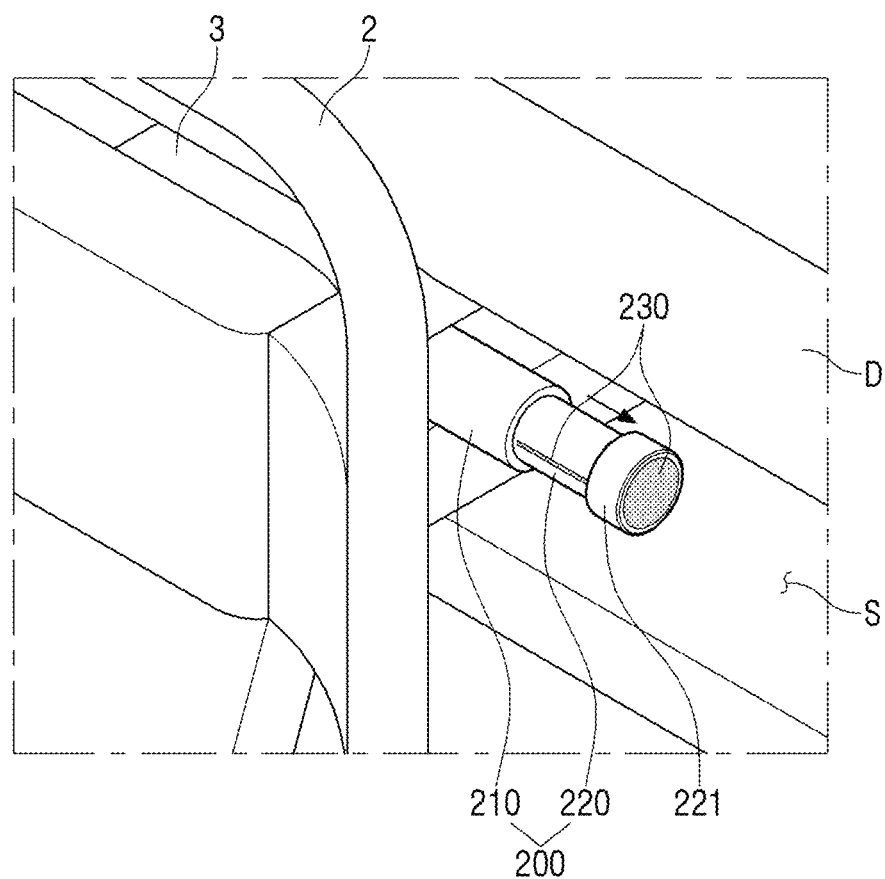

FIGS. 4 and 5 are schematic views showing a movable unit disposed at the first position and the second position by a linear movement according to an embodiment of the present disclosure. Referring to FIGS. 4 and 5, since the driver's transmission operation is not required in the first state, the transmission operation unit 200 may be at the first position, in which at least a portion of the movable unit 220 is accommodated in the fixed unit 210. On the other hand, since the driver's transmission operation is required in the second state, the transmission operation unit 200 may be at the second position, in which the movable unit 220 is linearly moved such that more of the movable unit 220 is exposed to the outside of the fixed unit 210, thereby making it possible for the driver to more easily recognize that the ignition of the vehicle is turned on.

In the above-described embodiments, the case where the position of the movable unit 220 is adjusted by rotation and the case where the position of the movable unit 220 is adjusted by linear movement are separately described, but this is only an example to help the understanding of the present disclosure. The present disclosure is not limited thereto, and the position of the movable unit 220 may be adjusted by a combination of rotation and linear movement.

The position adjusting unit 300 may adjust the position so that the movable unit 220 may be disposed at the first position or the second position according to a control signal of the controller.

Figure 6:
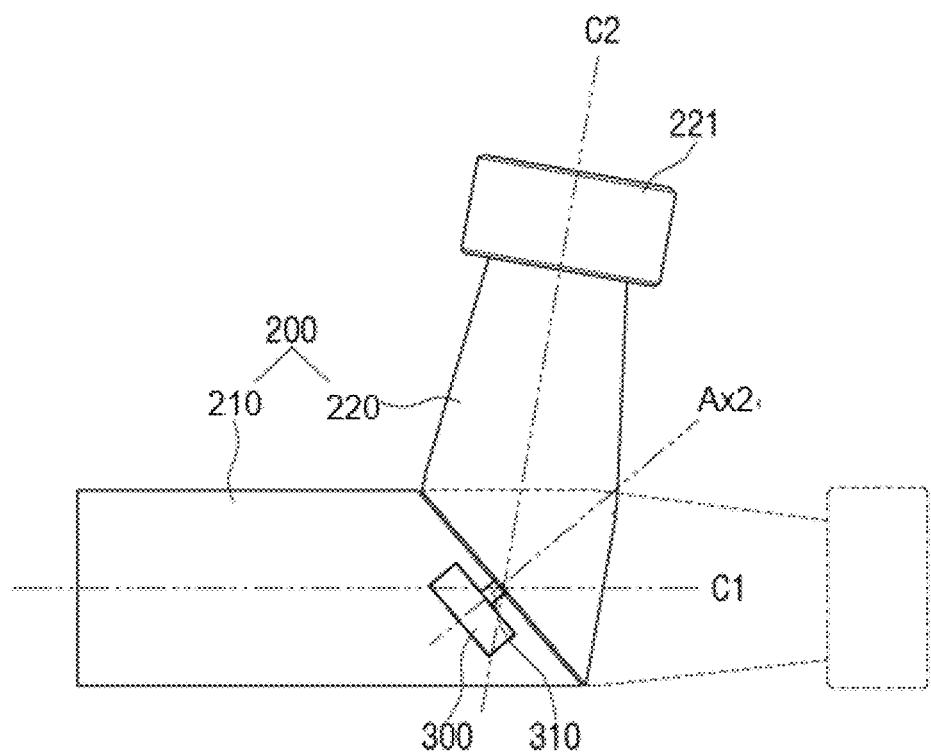
FIG. 6 is a schematic diagram showing a position adjusting unit according to an embodiment of the present disclosure.

FIG. 6 is a schematic diagram illustrating a position adjusting unit according to an embodiment of the present disclosure. Referring to FIG. 6, the position adjusting unit 300 according to the embodiment of the present disclosure may include a rotation shaft 310 coupled to the movable unit 220, and the rotation shaft 310 may be rotated with respect to a rotation axis Ax2 so that the movable unit 220 may be rotated with respect to the tilting axis Ax1 as shown in FIG. 3 described above.

At this time, since the rotation axis Ax2 of the rotation shaft 310 is tilted by a predetermined angle with respect to the central axis C1 of the fixed unit 210, the movable unit 220 may be rotated to be bent with respect to the fixed unit 210 in the first position, and the movable unit 220 may be parallel with the fixed unit 210 in the second position.

Figure 7:
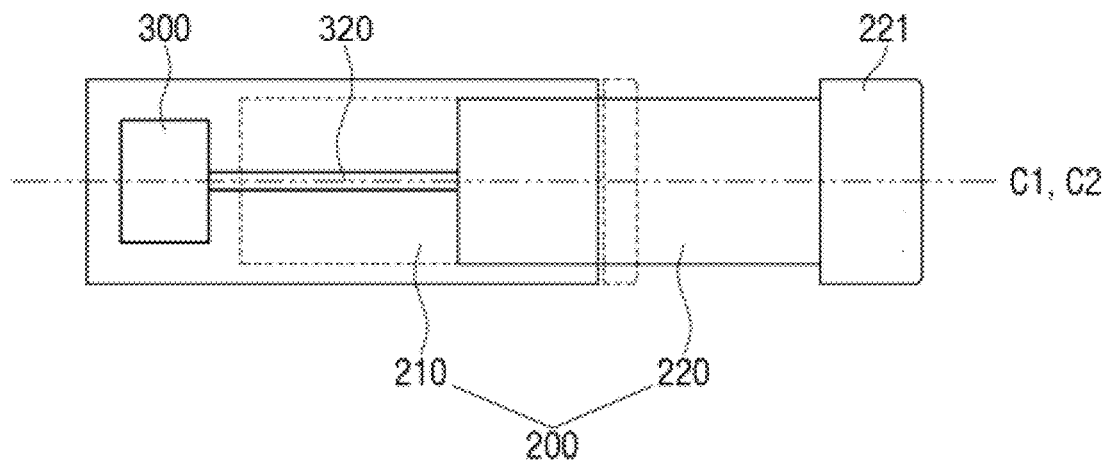
FIG. 7 is a schematic diagram showing a position adjusting unit according to another embodiment of the present disclosure.

FIG. 7 is a schematic diagram illustrating a position adjusting unit according to another embodiment of the present disclosure. Referring to FIG. 7, the position adjusting unit 300 according to another embodiment of the present disclosure may include a translation shaft (e.g., rod) 320 that is coupled with the movable unit 220 and linearly moved, and according to the moving direction of the translation shaft 320, the movable unit 220 may be linearly moved between the first position and the second position as shown in FIGS. 4 and 5 described above.

In the above-described position adjusting unit 300 of FIGS. 6 and 7, a driving force for adjusting the position of the movable unit 220 may be generated by a driving unit (e.g., an actuator). Various types of actuators such as a motor, a solenoid, or the like may be used depending on the position adjustment method of the movable unit 220.

Figure 8:
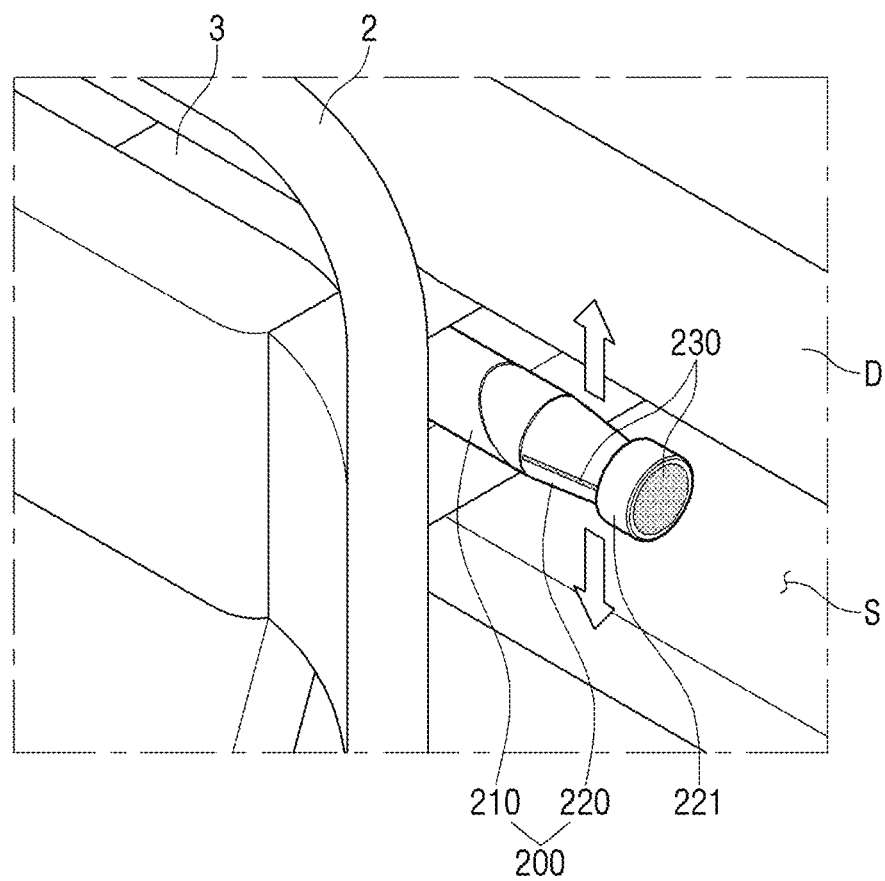
FIGS. 8 and 9 are schematic diagrams illustrating an operation method of a transmission operation unit according to an embodiment of the present disclosure.
Figure 9:
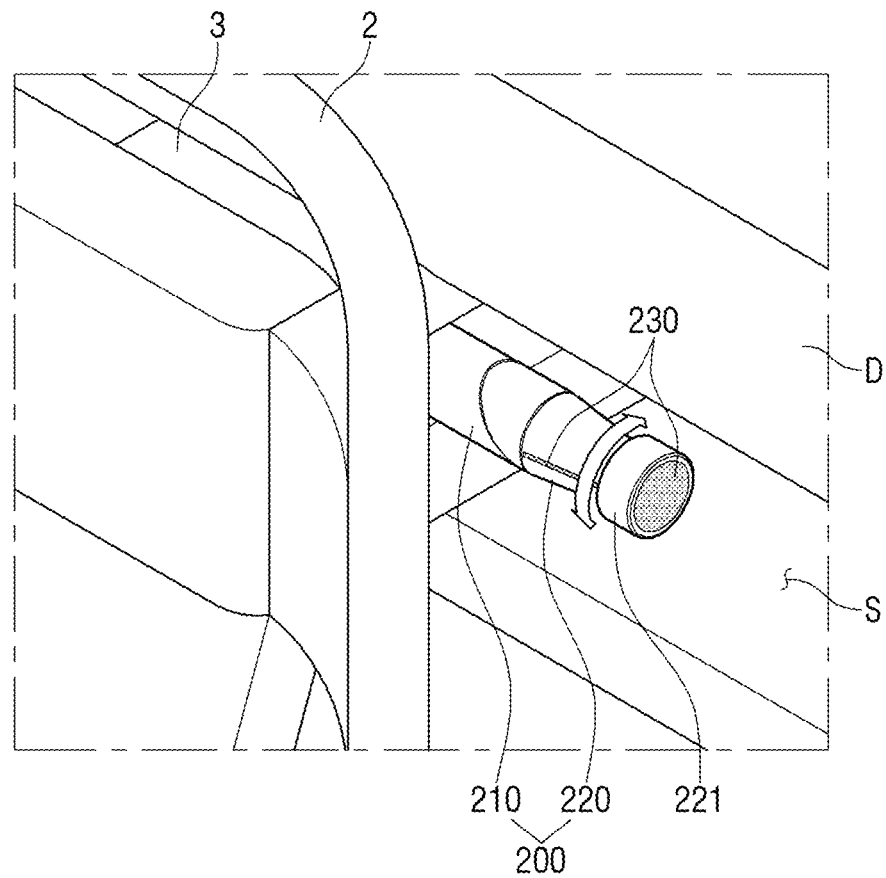

FIGS. 8 and 9 are schematic diagrams showing an operation method of a transmission operation unit according to an embodiment of the present disclosure, and FIGS. 8 and 9 are an example in which the movable unit 220 is rotated with respect to the tilting axis Ax1 to be disposed at the first position or the second position as shown in FIG. 3 described above. However, the description may be similarly applied even when the movable unit 220 is linearly moved.

Referring to FIG. 8, the transmission operation unit 200 may be tilted in its entirety while the movable unit 220 is disposed at the second position so as to select one of a plurality of transmission stages. In this case, the fixed unit 210 and the movable unit 220 installed in the column 3 may be integrally tilted so that the transmission stage can be selected.

Referring to FIG. 9, in some embodiments, at least a portion of the transmission operation unit 200 may be rotated while the movable unit 220 is disposed at the second position so as to select one of a plurality of transmission stages. FIG. 9 is an example in which a rotation member 221 provided at a distal end of the movable unit 220 is rotated to select a transmission stage while the rest of the fixed unit 210 and the movable unit 220 are fixed. The present disclosure is not limited thereto, however, and the transmission stage can be selected as the movable unit 220 is rotated as a whole, or as the movable unit 220 and the fixed unit 210 are rotated integrally.

In the embodiment of the present disclosure, the transmission stages may be selected in the order of park (P), reverse (R), neutral (N), and drive (D) stages or in the reverse order thereof depending on the tilt or rotation direction of the transmission operation unit 200. Further, some transmission stages (e.g., the P stage) of the above-described transmission stages may be selected by a button or a switch provided separately from the transmission operation unit 200.

In addition, when the position is adjusted from the first position to the second position, in which the transmission operation is enabled, by rotation or linear movement of the movable unit 220, the initial default transmission stage may be P or N stage, and when at least one transmission condition such as vehicle speed, operation of a brake pedal, or the like is satisfied, another transmission stage may become available for selection.

Figure 10:
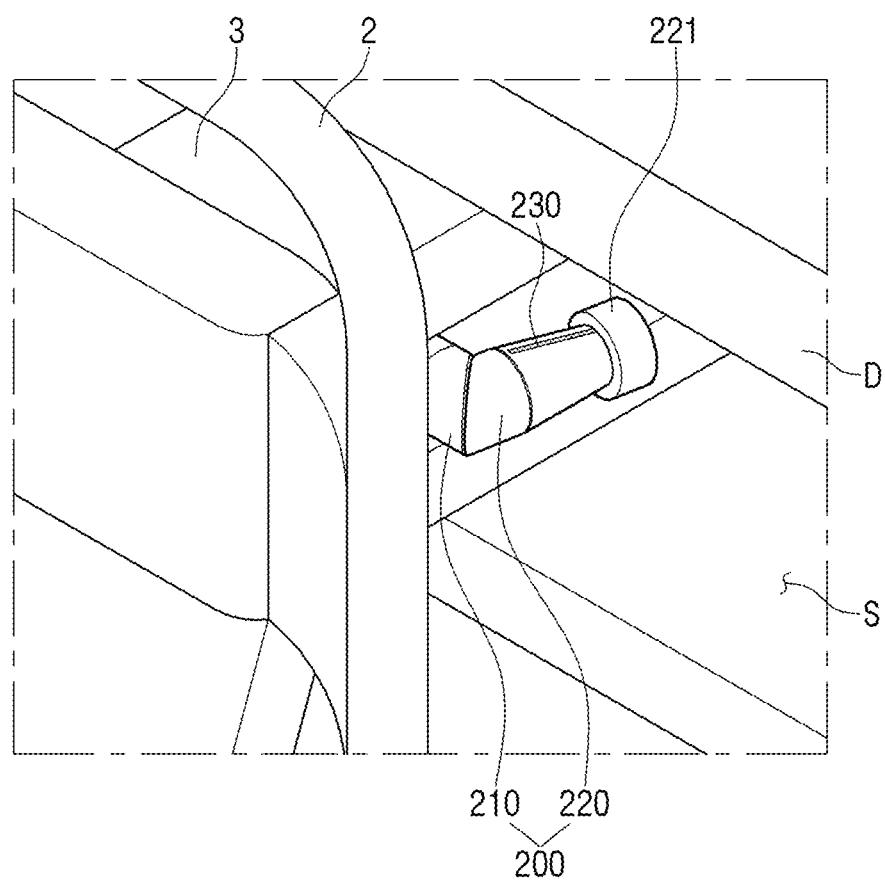
FIGS. 10 and 11 are schematic views showing a transmission operation unit accommodated in a storage space according to an embodiment of the present disclosure.
Figure 11:
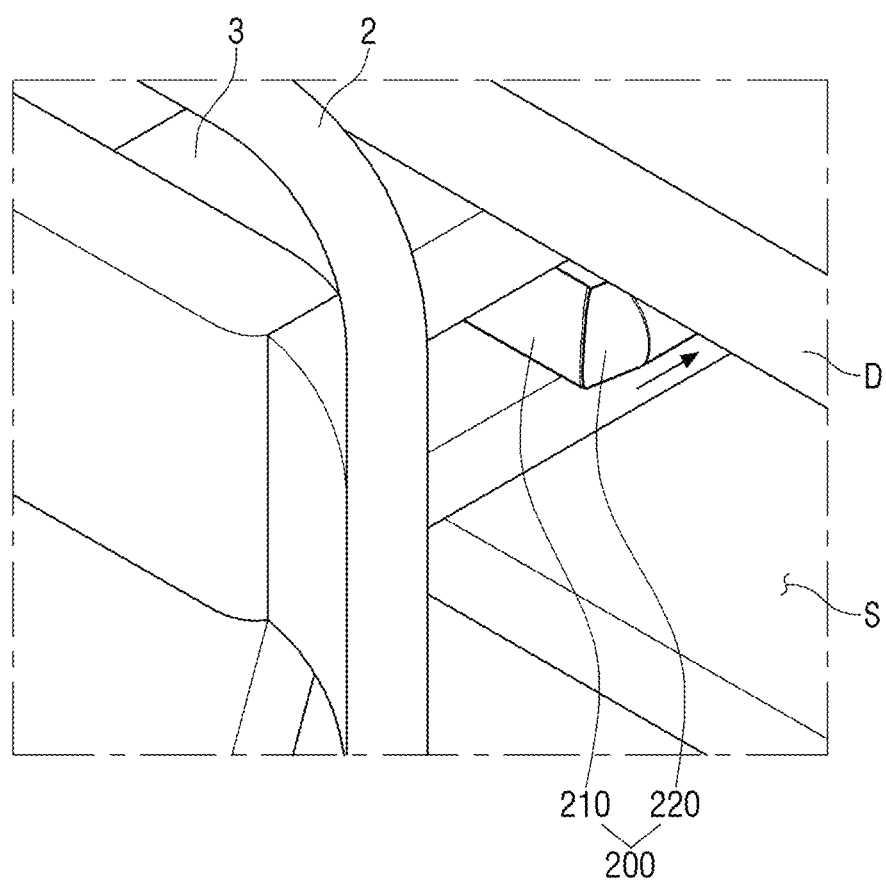

FIGS. 10 and 11 are schematic views showing a transmission operation unit accommodated in a storage space according to an embodiment of the present disclosure, and FIGS. 10 and 11 are an example in which the movable unit 220 is rotated with respect to the tilting axis Ax1 as shown in FIG. 3 above to be switched between the first position and the second position.

Referring to FIGS. 10 and 11, the transmission operation unit 200 may be moved between the inside and the outside of the storage space S formed on the dashboard D. This feature may ensure that the transmission operation unit 200 is accommodated in the storage space S in the ignition-off state and is not visible, and that the transmission operation unit 200 is moved to the outside of the storage space S in the ignition preparation state or the ignition-on state and is visible to the driver.

In the embodiment of the present disclosure, although the case in which the movable unit 220 is rotated at a predetermined angle compared to FIG. 3 to be accommodated in the storage space S so that it can be accommodated through the opening of the storage space S in the second position is described as an example. This is because the transmission operation unit 200 has an overall bent shape in the ignition-off state or in the ignition preparation state, but the present disclosure is not limited thereto. In the embodiment where the movable unit 220 linearly moves, the process of rotating the transmission operation unit 200 at a predetermined angle prior to being accommodated in the storage space S may be omitted.

In the aforementioned transmission operation unit 200, at least one light emitting module 230 may be provided in at least one of the fixed unit 210 or the movable unit 220 for forming a lighting image of a predetermined shape. For example, at least one light emitting module 230 may form a lighting image that performs a welcoming function that facilitates the communication between the vehicle and the driver by letting the vehicle respond as if welcoming the driver in the first state. In this case, a lighting image having at least one color may be formed from at least a portion of the light emitting module 230. When at least one light emitting module 230 is used as the welcoming function, the brightness of the light emitted from the light emitting module 230 may be maintained constant, or may be gradually increased or decreased to improve the aesthetics perceived by the driver.

In addition, at least one light emitting module 230 may also display a lighting image that indicates the transmission stage that is currently selected by the driver in the second state. For example, the lighting image may display letter "D" if the selected transmission stage corresponds to the drive (D) stage.

In addition, when the vehicle ignition is turned off due to the end of vehicle driving, the light emitting module 230 may form a lighting image of a predetermined color or may gradually increase or decrease the brightness of the lighting image so that the driver can recognize that the vehicle ignition is turned off.

As described above, in the vehicle transmission device 1 of the present disclosure, the movable unit 220 may be disposed at different positions depending on whether the vehicle ignition is on or off, such that it may prevent accidents against a human or a vehicle due to the driver's relative difficulty to recognize that the ignition of the vehicle is turned on in an electric vehicle, as well as in an internal combustion engine vehicle.

In concluding the detailed description, those skilled in the art will appreciate that many variations and modifications can be made to the exemplary embodiments without substantially departing from the principles of the present disclosure. Therefore, the disclosed exemplary embodiments are used in a generic and descriptive sense only and not for purposes of limitation.

What is claimed is:

1. A transmission device for a vehicle, comprising:
   a vehicle state detector for detecting a vehicle state, the vehicle state including a first state which indicates that an ignition of the vehicle is off, and a second state which indicates that the ignition of the vehicle is on;
   a transmission operation unit, which includes a fixed unit provided in a column of a steering wheel for enabling a transmission operation and a movable unit configured to be switched between a first position and a second position with respect to the fixed unit; and
   a position adjusting unit for adjusting a position of the movable unit based on the detected vehicle state.

2. The transmission device of claim 1, wherein the first state includes a state in which an engine of an internal combustion engine vehicle is not running or a state in which an electric vehicle is not drivable, and
   wherein the second state includes a state in which the engine of the internal combustion engine vehicle is running or a state in which the electric vehicle is drivable.

3. The transmission device of claim 1, wherein the movable unit of the transmission operation unit is disposed at the first position in response to the vehicle state being the first state to disable the transmission operation, and
   wherein the movable unit of the transmission operation unit is disposed at the second position in response to the vehicle state being the second state to enable the transmission operation.

4. The transmission device of claim 3, wherein an initial transmission stage is P or N stage in response to the movable unit being in the second position, and
   wherein another transmission stage becomes selectable in response to at least one transmission condition being satisfied.

5. The transmission device of claim 1, wherein the first state includes an ignition preparation state which indicates that the ignition of the vehicle is off and the vehicle is expected to be driven.

6. The transmission device of claim 1, wherein at least a portion of the transmission operation unit is rotated or tilted to select a transmission stage while the movable unit is in the second position.

7. The transmission device of claim 1, wherein the transmission operation unit further comprises at least one light emitting module installed in at least one of the fixed unit or the movable unit for forming a lighting image having a predetermined shape.

8. The transmission device of claim 7, wherein the at least one light emitting module forms a lighting image that performs a welcoming function in the first state, and forms a lighting image that indicates a current transmission stage in the second state.

9. The transmission device of claim 1, wherein the movable unit is rotatably coupled to the fixed unit to be rotatable with respect to a tilting axis.

10. The transmission device of claim 9, wherein a central axis of the movable unit and a central axis of the fixed unit are angled with each other in the first position, and the central axis of the movable unit and the central axis of the fixed unit are parallel with each other in the second position.

11. The transmission device of claim 10, wherein the position adjusting unit includes a driving unit, and a rotation shaft that is rotated with respect to a rotation axis of the movable unit by a driving force from the driving unit to allow the movable unit to be tilted about the tilting axis at a predetermined angle with respect to the central axis of the fixed unit.

12. The transmission device of claim 1, wherein the movable unit is coupled to the fixed unit to be linearly movable substantially along a longitudinal direction of the fixed unit.

13. The transmission device of claim 12, wherein, when the movable unit moves linearly, a central axis of the fixed unit and a central axis of the movable unit are parallel with each other in the first position and in the second position.

14. The transmission device of claim 13, wherein the position adjusting unit includes a driving unit, and a translation shaft coupled to the movable unit, and
    wherein the translation shaft is configured to be linearly moved by a driving force from the driving unit.

15. The transmission device of claim 1, further comprising:
    a storage space, in which the transmission operation unit is accommodated,
    wherein the transmission operation unit is moved between inside and outside of the storage space based on the detected vehicle state.

16. A method for operating a transmission device of a vehicle, comprising:
    detecting a vehicle state, the vehicle state including a first state which indicates that an ignition of the vehicle is off, and a second state which indicates that the ignition of the vehicle is on; and
    adjusting a position of a movable unit between a first position and a second position based on the detected vehicle state,
    wherein the movable unit is coupled to a fixed unit provided in a column of a steering wheel, whereby the position of the movable unit is adjustable with respect to the fixed unit.

17. The method of claim 16, wherein the adjusting the position comprises rotating the movable unit with respect to a tilting axis.

18. The method of claim 16, wherein the adjusting the position comprises linearly moving the movable unit substantially along a longitudinal direction of the fixed unit.

19. The method of claim 16, further comprising:
    forming a lighting image having a predetermined shape using a light emitting module installed in at least one of the fixed unit or the movable unit depending on whether the movable unit is disposed in the first position or the second position.

20. The method of claim 19, wherein the forming the lighting image comprises:

forming a lighting image that performs a welcoming function in response to the movable unit being in the first position, and forming a lighting image that indicates a current transmission stage in response to the movable unit being in the second position.

\* \* \* \* \*